A. G. KAUFMAN.
VAPORIZER STRAINER FOR LAMPS.
APPLICATION FILED JULY 15, 1919.
1,342,849.
Patented June 8, 1920.
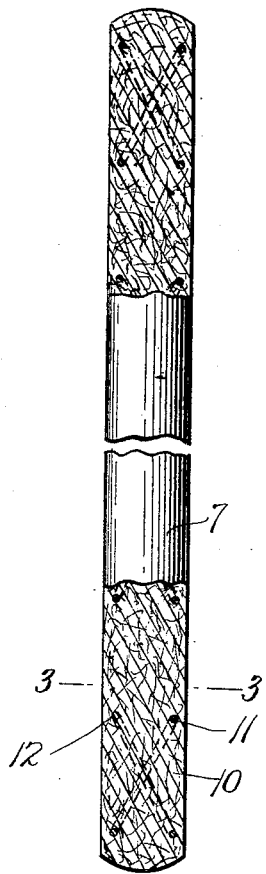
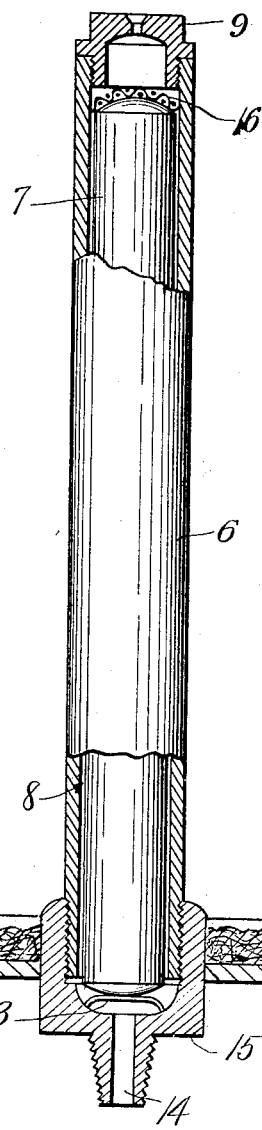
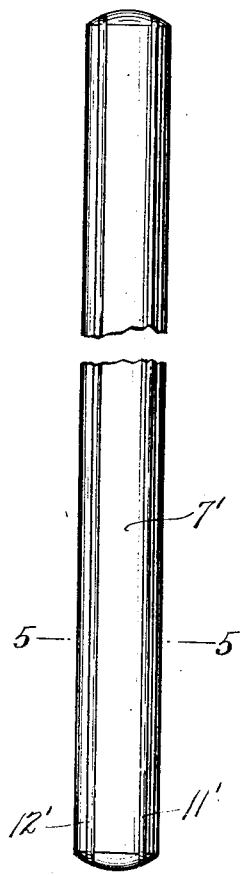
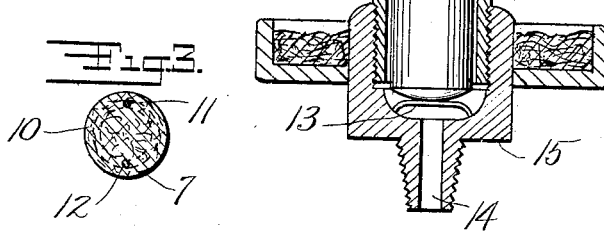
INVENTOR
Adolph G. Kaufman
BY
Garry P. Van Wye
ATTORNEY

UNITED STATES PATENT OFFICE.

ADOLPH G. KAUFMAN, OF NEW YORK, N. Y.

VAPORIZER-STRAINER FOR LAMPS.

1,342,849.     Specification of Letters Patent.     Patented June 8, 1920.

Application filed July 15, 1919. Serial No. 310,929.

*To all whom it may concern:*

Be it known that I, ADOLPH G. KAUFMAN, a citizen of the United States, residing at New York, in the county and State of New York, have invented a new and useful Vaporizer-Strainer for Lamps, of which the following is a specification.

This invention relates to vaporizers, or fillers for vaporizing tubes on lamps where the volatile fluid is vaporized and then burned in connection with an incandescent mantle, or mantles. In the trade these fillers are known as "strainers", and the trade name has been applied to the part. The object of my invention is to provide a strainer that will stand up, and maintain a uniform diameter throughout its length especially while in use.

The invention is illustrated in the accompanying drawing, in which—

Figure 1, is an elevation of a vaporizing tube of a lamp, with parts broken away to show my improved strainer mounted therein;

Fig. 2, is an elevation of the strainer with parts in section to show the construction;

Fig. 3, is a transverse section thereof, on the line 3—3 of Fig. 2;

Fig. 4, is an elevation view of a modified form of strainer; and,

Fig. 5, is a transverse section, on the line 5—5 of Fig. 4.

In the drawing similar numerals of reference refer to the same part in each of the views.

As usually constructed the strainer is made out of very loose fibrous material—generally asbestos, so that the fluid being gasified will readily flow through the same, and the gas when formed can readily escape and flow to the burner, or burners. Owing to the nature of the material forming the strainer it is desirable to so construct it that the same will remain uniform in thickness throughout the length of the vaporizing tube; and will be prevented from "bunching" to stop the flow of gas to the mixing chamber.

In this application a plurality of wires are used to hold the strainer uniform in diameter throughout its length. As the wire is stiff it is evident that very small wire will answer the purpose of holding the strainer upright if a number of strands are used. At the same time, where wire is used to stiffen the strainer it is desirable that the surface of the strainer should not be materially covered; and that if covered at all the strands of wire should be used in such a way that the flow of gas will not be interfered with in its passage to the air mixer from the vaporizer. With these objects in view I prefer to form the strainer by weaving a number of strands of wire in the asbestos when the strainer is formed. I have shown this method of construction as the preferred form.

As shown, the vaporizing tube 6 has mounted therein a strainer 7 in a manner so that a space 8 will be left between the strainer and the inner wall of the tube for the passage of the gas to the nozzle 9, and from thence to the air mixer, as will be understood. It will be noted that the space 8 is not great so that it is very important to keep the strainer from bunching when in use, as it is very liable to do owing to the pulsations, or vibration of the gas and fluid. To keep the strainer uniform in diameter I prefer to weave into the asbestos 10 when formed into the strainer 7 a plurality of strands of wire. As shown, I weave into the strainer two wires 11 and 12, although any number of strands may be woven in, as will be understood. When woven in the wires will hold the strainer uniform in diameter; and will prevent bunching, or sagging in use. At the same time the wires will not interfere with the action of the strainer as the same are embedded within the asbestos. It will be understood that in weaving the wire strands in the asbestos the strands will draw on the loose asbestos to bring it closely together, and hold it in a firm manner. Thus the strands combined really form a core within the strainer to hold the strainer upright; and as the wires will draw the asbestos toward the center the fibers of the asbestos between the strands and the outer surface will intervene between the core and the outer surface to maintain the surface of the strainer uniform, as will be understood. It will thus be seen that the fibers of the asbestos will be the means of binding the outer surface of the strainer to the core in a manner that the strainer will be uniform in diameter, and the space between the strainer and the vaporizing tube will always be maintained.

The strainer 7 can be mounted in the vaporizing tube 6 on a small bracket 13, or in any desired manner, so as to keep the strainer from closing the inlet passageway 14 from the reservoir through the part 16; and I may also use a cap 16 to prevent the strainer clogging the nozzle 9.

In Figs. 4 and 5 I have shown a modified form of construction in that two wires are used, 11' and 12' on the outside of the asbestos 10' forming the strainer 7'. It will be noted that when using the wires this way they are embedded in the wall of the strainer, as clearly shown in Fig. 5 so that the asbestos lying within the wires, or intervening between the wires will be compressed in a manner to form a core; and the vaporizer will be held upright and uniform in thickness.

I claim:

1. A vaporizer strainer comprising a cylinder of fibrous material held uniform in diameter, and a plurality of wires interwoven in said fibrous material throughout its length, for the purpose set forth.

2. A vaporizer strainer for lamps cylindrical in form and composed of fibrous material and interwoven wires throughout its length, for the purpose set forth.

3. A vaporizer strainer for lamps cylindrical in form, and composed of asbestos and interwoven strands of wire, said wires inclosing the core of the vaporizer in weaving whereby said core is compressed and the surface of the said cylinder is held at a uniform distance from the central part of the core.

Dated 14th day of July, 1919.

ADOLPH G. KAUFMAN.